United States Patent
Hiraga et al.

(10) Patent No.: US 8,814,634 B2
(45) Date of Patent: Aug. 26, 2014

(54) CONVEYING APPARATUS AND A BLASTING MACHINE

(75) Inventors: Mikitoshi Hiraga, Aichi (JP); Ryoichi Tsunoda, Aichi (JP); Kenichiro Inagaki, Aichi (JP); Kazuyoshi Maeda, Aichi (JP)

(73) Assignee: Sintokogio, Ltd., Aichi (JP)

( * ) Notice: Subject to any disclaimer, the term of this patent is extended or adjusted under 35 U.S.C. 154(b) by 680 days.

(21) Appl. No.: 12/988,995

(22) PCT Filed: Apr. 10, 2009

(86) PCT No.: PCT/JP2009/057376
§ 371 (c)(1),
(2), (4) Date: Oct. 21, 2010

(87) PCT Pub. No.: WO2009/131021
PCT Pub. Date: Oct. 29, 2009

(65) Prior Publication Data
US 2011/0039481 A1 Feb. 17, 2011

(30) Foreign Application Priority Data

Apr. 23, 2008 (JP) ................. 2008-112006
Apr. 3, 2009 (JP) ................. 2009-091507

(51) Int. Cl.
*B24C 9/00* (2006.01)
*B65G 39/06* (2006.01)

(52) U.S. Cl.
CPC .. *B24C 9/00* (2013.01); *B65G 39/06* (2013.01)
USPC ............................ 451/83; 198/624

(58) Field of Classification Search
CPC ................... B24C 9/00; B65G 39/06
USPC ............................ 451/83; 198/624
See application file for complete search history.

(56) References Cited

U.S. PATENT DOCUMENTS 1,505,484 A * 8/1924 Mulvany et al. ............. 451/38
1,928,339 A * 9/1933 Mulvany .................... 451/83

(Continued)

FOREIGN PATENT DOCUMENTS

JP 63-125201 5/1988
JP 4-284453 10/1992

(Continued)

OTHER PUBLICATIONS

International Search Report dated Jul. 14, 2009 issued in corresponding International Application No. PCT/JP2009/057376.
Office Action for TW OA Application No. 098112774 mailed Oct. 17, 2013.

*Primary Examiner* — Maurina Rachuba
(74) *Attorney, Agent, or Firm* — Finnegan, Henderson, Farabow, Garrett & Dunner, L.L.P.

(57) ABSTRACT

This invention provides a conveying apparatus and a blasting machine equipped with the conveying apparatus that can prevent workpieces from being damaged by the used abrasives attached to the conveying rollers.
For the conveying apparatus, a peripheral part 33a disposed at the peripheral surface of a rolling member 33 of a rolling roller 31 is made of a softer elastic material than the material of the panel P, wherein when used abrasives get stuck between the peripheral part 33a of the rolling member 33 and the panel P, since the peripheral part 33a acts as a cushioning material that can reduce the force caused by the used abrasives and loaded on the panel P, even if the panel P is made of a fragile material, such as glass, the panel P can be conveyed without flaws being caused by the used abrasives.

4 Claims, 5 Drawing Sheets

(56) References Cited

U.S. PATENT DOCUMENTS

| | | | | |
|---|---|---|---|---|
| 2,780,039 | A | * | 2/1957 | Cusick ............ 451/412 |
| 3,570,186 | A | * | 3/1971 | Kulwicki ............ 451/188 |
| 3,621,960 | A | | 11/1971 | Kornylak |
| 3,970,204 | A | * | 7/1976 | Lutz ............ 414/432 |
| 4,872,294 | A | * | 10/1989 | Watts ............ 451/83 |
| 5,927,469 | A | | 7/1999 | Dunifon et al. |
| 8,453,831 | B1 | * | 6/2013 | Thimmel et al. ............ 198/842 |
| 2002/0124402 | A1 | | 9/2002 | Berthelet et al. |
| 2004/0216626 | A1 | | 11/2004 | Mori |

FOREIGN PATENT DOCUMENTS

| | | |
|---|---|---|
| JP | 11-254330 | 9/1999 |
| JP | 2000-287848 | 10/2000 |
| JP | 2001-332748 | 11/2001 |
| JP | 2003-080458 | 3/2003 |
| JP | 2004-2622124 | 9/2004 |
| WO | WO 2007/074734 A1 | 7/2007 |

\* cited by examiner

CONVEYING APPARATUS AND A BLASTING MACHINE

TECHNICAL FIELD

This invention relates to a conveying apparatus for loading and conveying flat plate-shaped workpieces by projecting abrasives and a blasting machine equipped with the conveying apparatus.

BACKGROUND OF THE INVENTION

Conventionally, a blasting process is used for the technical field of treatment for surfaces of workpieces, such as removing burrs, roughening surfaces of workpieces, and removing flow marks from castings. Recently, it is also used for the technical field of micro-machining that is used for working parts of semiconductors, electronic components, liquid crystals, etc. Since the blasting process is a kind of a dry process, no treatment for waste liquid, such as an etching agent, is required. Thus, effects on the environment can be reduced. Further, since the processes for the treatment for surfaces of workpieces can be simplified, a low cost processing can be achieved. As an example for applying the blasting process to the technical field of micro-machining, Patent Document 1 discloses a technology for applying the blasting process to the micro-machining for substrates used for a solar cell module.
Patent Document 1: Japanese Patent Laid-open Publication 2001-332748

DISCLOSURE OF INVENTION

When the blasting process is carried out, the workpieces are conveyed into a chamber for blasting abrasives by a conveying apparatus, such as conveying rollers. Generally, the conveying rollers are made of a metallic material, such as stainless steel, or a hard resin material. For the conveying apparatus having such a constitution, when the workpieces made of a fragile material, such as glass like the substrates used for a solar cell module, are processed by blasting abrasives, the surfaces of the substrates may be damaged, because the used abrasives enter the spaces between the conveying rollers and the workpieces.

The purpose of this invention is to provide a conveying apparatus and a blasting machine equipped with the conveying apparatus that can prevent the workpieces from being damaged by the used abrasives attached to the conveying rollers.

To achieve the purpose of this invention, the first invention has the following technical constitution:

A conveying apparatus for loading and conveying workpieces by blasting process, the conveying apparatus having the following technical features:

a plurality of conveying rollers placed in parallel in a line so that the rollers form a passage for the workpieces, the conveying roller comprising:

a shaft acts as an axis of rotation, and a plurality of rolling members disposed at the peripheral surface of the shaft with predetermined intervals along the longitudinal direction of the shaft, wherein the outer surfaces of the plurality of rolling members form the surface of the passage, wherein the workpieces can be conveyed by rotating each shaft, wherein a peripheral part of the rolling member, which part contacts the workpieces, is made of an elastic material that is softer than the material of the workpieces, and wherein when used abrasives get stuck between the peripheral part of the rolling member and the workpieces, the peripheral part acts as a cushioning material that can reduce the force caused by the used abrasives and loaded on the workpieces.

By the first invention, the conveying apparatus for loading and conveying flat plate-shaped workpieces comprises the peripheral parts of the rolling members of the conveying roller, which parts contact with the workpieces. The peripheral parts are made of a softer elastic material than the material of the workpieces. Thus, since when used abrasives get stuck between the peripheral part of the rolling member and the workpieces, the peripheral part acts as a cushioning material that can reduce the force caused by the used abrasives and loaded on the workpieces, even if the workpieces are made of a fragile material, such as glass, the workpieces can be conveyed without flaws being caused by the used abrasives. Further, since the peripheral parts of the rolling members are made of a soft and elastic material, the used abrasives are removed from the surfaces of the peripheral parts when the loads caused by the weight of the workpieces are eliminated from the peripheral parts. This will help to prevent the workpieces from being damaged by the used abrasives that are attached to the peripheral parts of the rolling members.

The second invention has the following technical constitution:

The conveying apparatus of the first invention, wherein the peripheral parts of the rolling members are made of urethane foam having a structure that includes separated air bubbles.

By the second invention, since the peripheral parts of the rolling members are made of urethane foam having a structure comprising separated air bubbles, it is preferable to blast abrasives toward the workpieces made of a fragile material, such as glass, because the peripheral parts effectively act as a cushioning material that can reduce the force caused by the used abrasives and loaded on the workpieces. Further, since the urethane foam has a structure comprising separated air bubbles, there are no open pores at the surfaces of the peripheral parts. Thus, since it is easy to remove the used abrasives from the surfaces of the peripheral parts, the workpieces the next time can be prevented from being damaged by the used abrasives that are attached to the peripheral parts.

The third and fourth inventions have the following technical construction:

The conveying apparatus of the first invention, wherein the rolling members of the plurality of conveying rollers are arranged so that the rolling members adjacent to conveying rollers form a zigzag pattern in the direction for the conveyance.

By the third and fourth inventions, the rolling members of the plurality of conveying rollers are arranged so that the rolling members adjacent to conveying rollers form a zigzag pattern in the direction for the conveyance. Thus, even if a load that moves the workpieces along an S-shaped passage on the conveying apparatus is caused, the conveying rollers can prevent the workpieces from being moved along the S-shaped passage on the conveying apparatus because the conveying rollers can properly transfer a load for conveying the workpieces to them so that the workpieces can be prevented from being moved along the S-shaped passage on the conveying apparatus. Since large and flat plate-shaped workpieces are likely to move along the S-shaped passage when they are conveyed by a conveying apparatus, such a conveying apparatus is preferable to convey the large and flat plate-shaped workpieces.

The fifth invention has the following technical constitution:

A blasting machine for blasting abrasives from a nozzle toward workpieces, wherein the blasting machine carries out the blasting process for the workpieces while sweeping the nozzle over the workpieces, where the blasting machine comprises any one of the conveying apparatuses of the first, second, third, and fourth invention.

By the fifth invention, the blasting machine that has the same effects as those of the first, second, third, and fourth invention can be provided.

PREFERRED EMBODIMENT OF THE INVENTION

Figure 1:
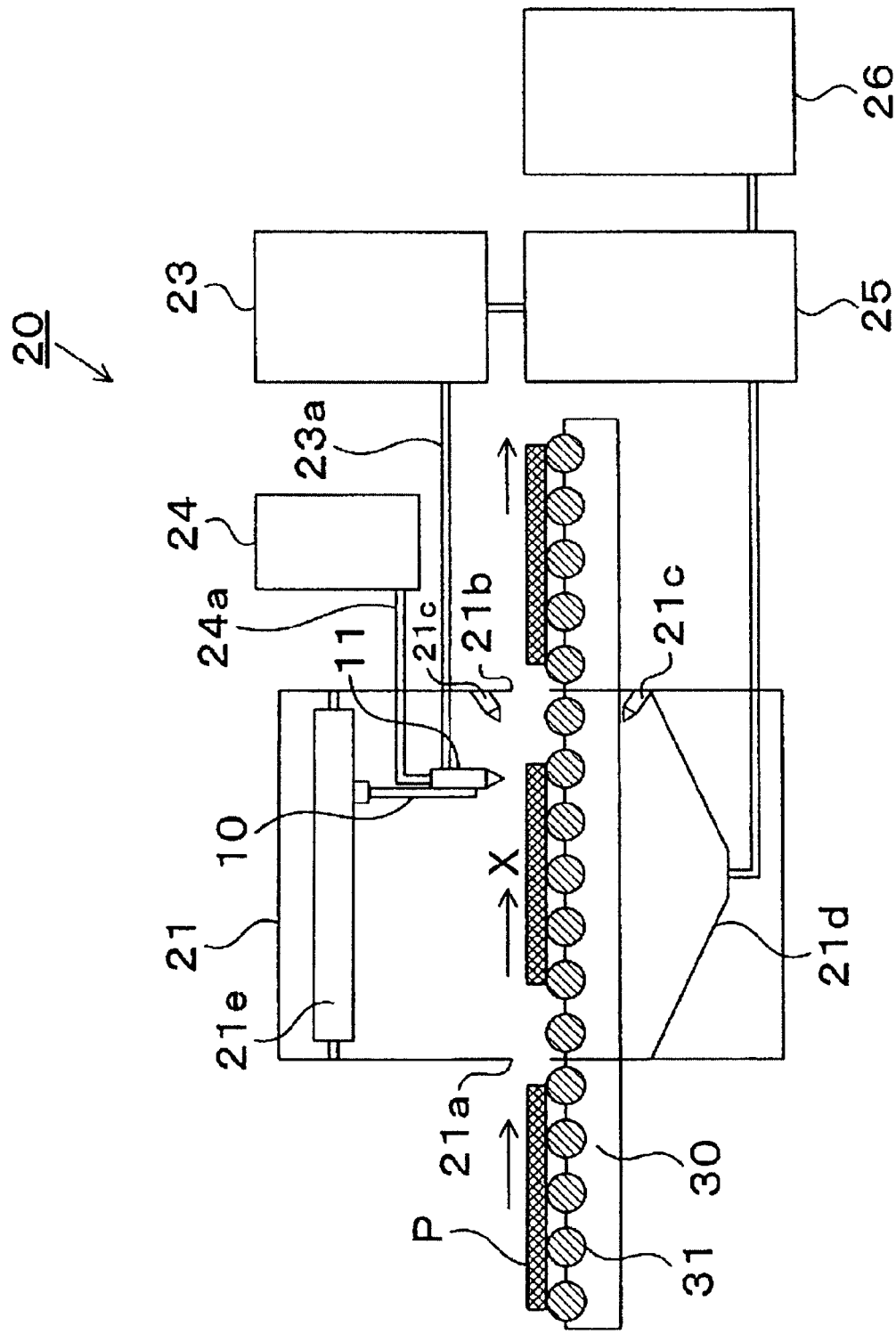
FIG. 1 is an illustrative drawing showing the constitution of the blasting machine.
Figure 2:
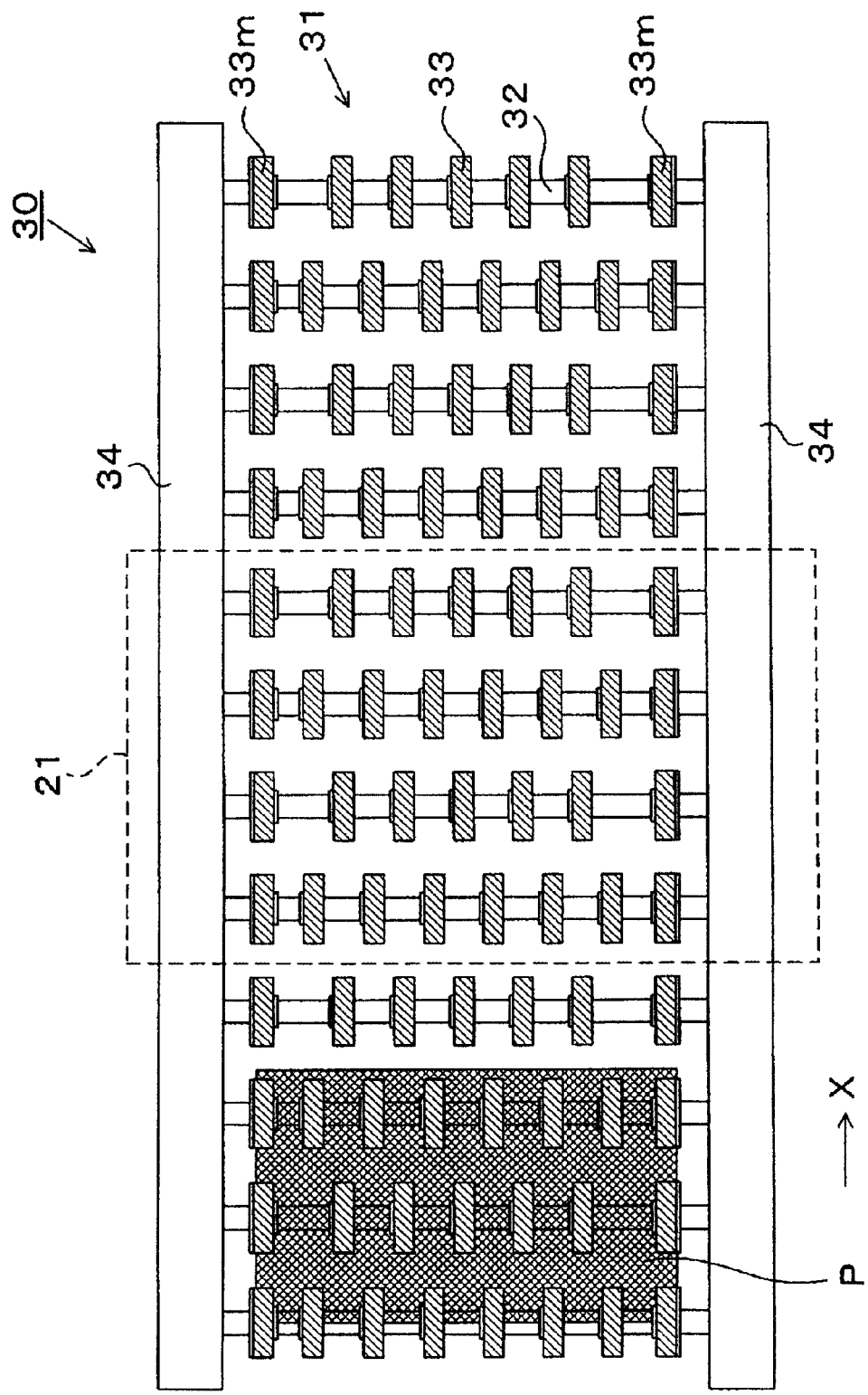
FIG. 2 is an illustrative drawing showing the constitution of the conveying apparatus.
Figure 3:
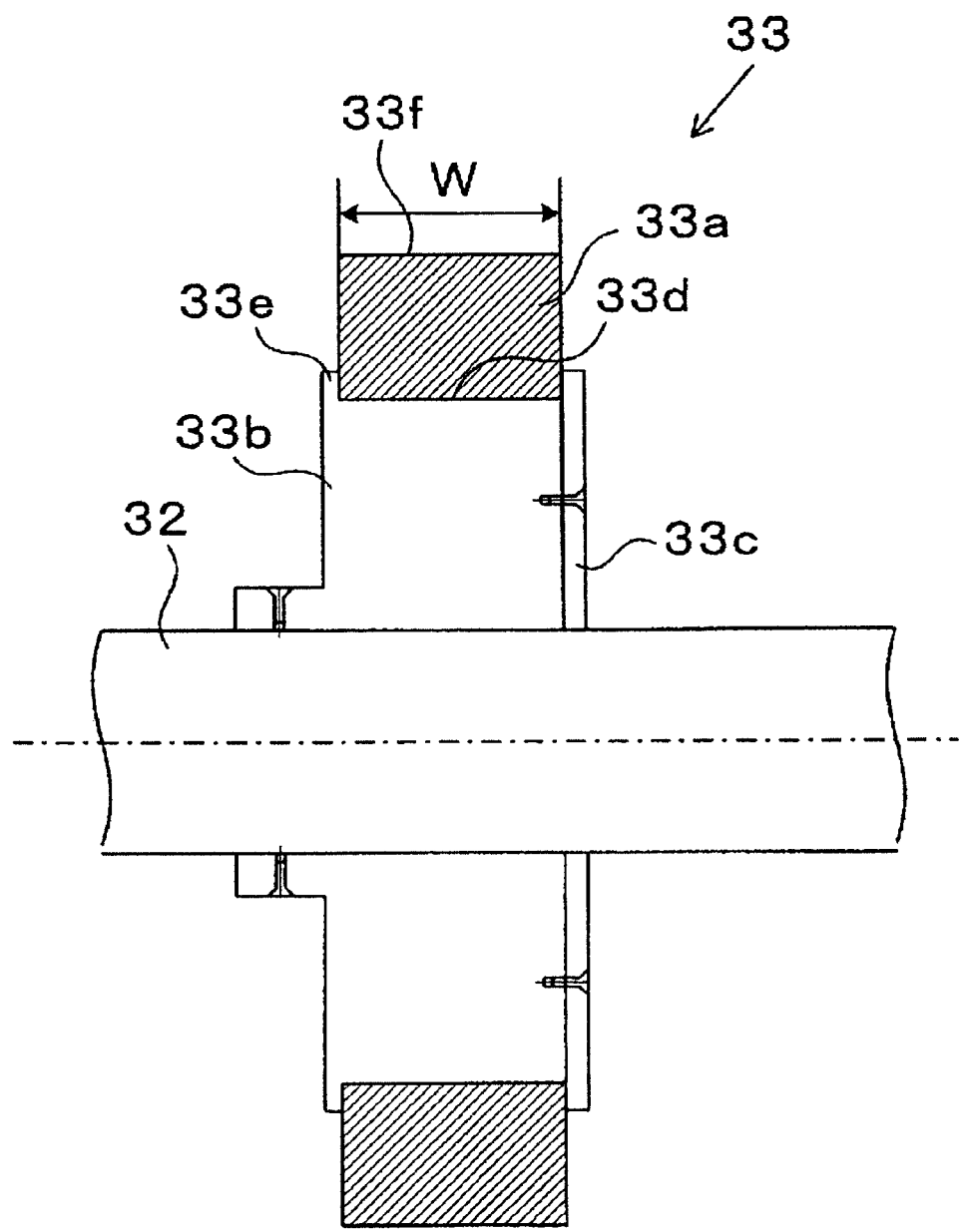
FIG. 3 is a sectional drawing showing the structure of a rolling member.
Figure 4:
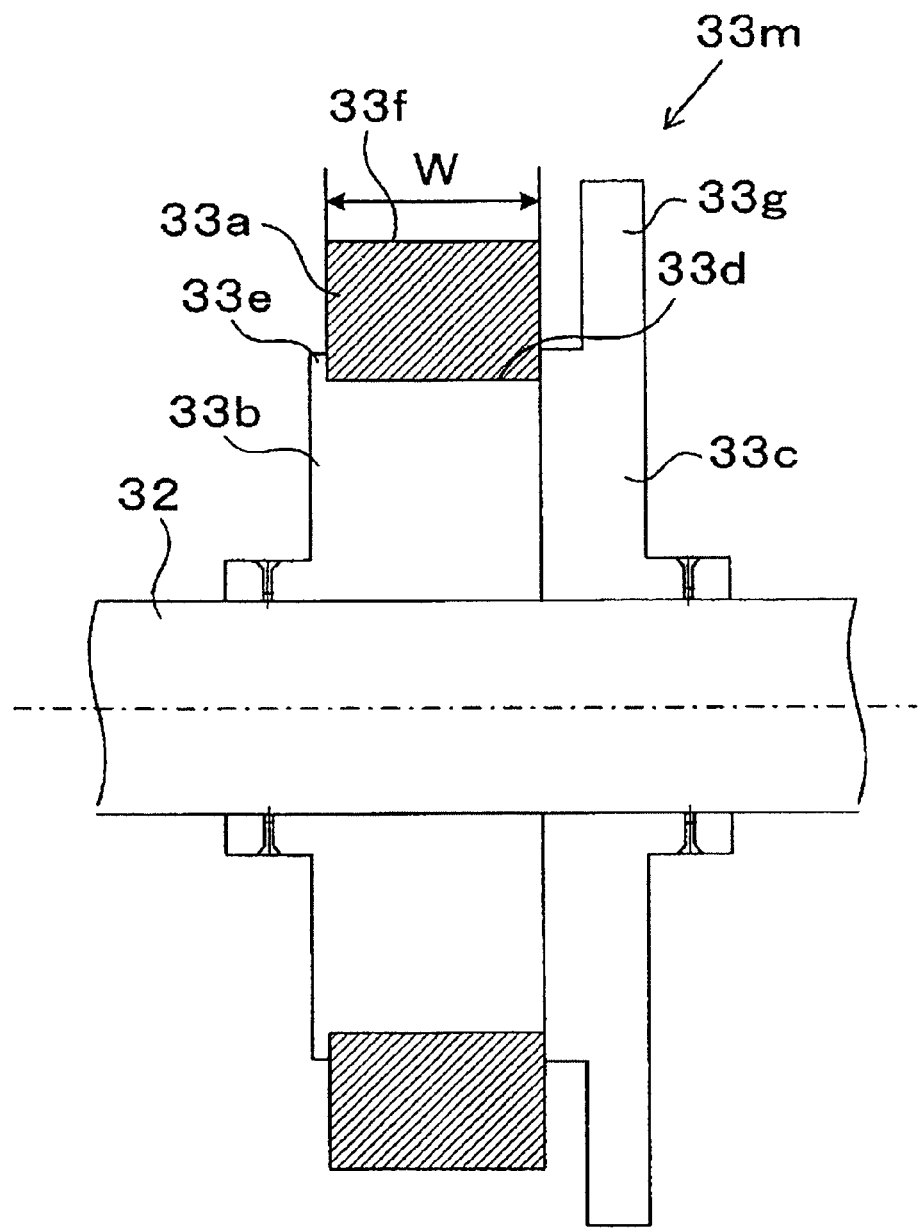
FIG. 4 is a sectional drawing showing the structure of a rolling member that is placed at the end of a conveying roller.
Figure 5:
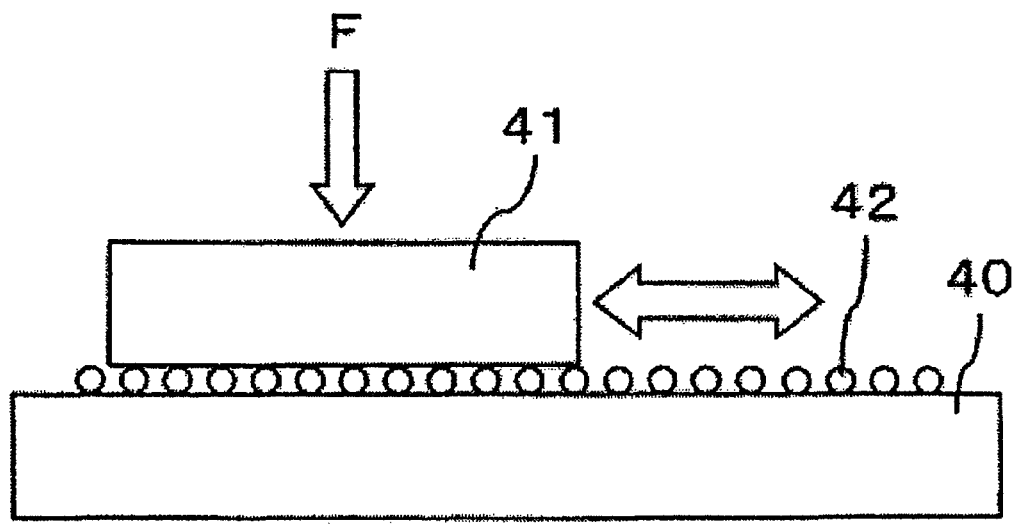
FIG. 5 is an illustrative drawing showing the device for evaluating the effects of this invention.

The conveying apparatus and the blasting machine of this invention are now explained based on the figures. In this explanation, a peripheral edge of a solar cell panel P is used for being blasted, as a sample to be processed. FIG. 1 is an illustrative drawing showing the constitution of the blasting machine. FIG. 2 is an illustrative drawing showing the constitution of a conveying apparatus. FIG. 3 is a sectional drawing showing the structure of a rolling member. FIG. 4 is a sectional drawing showing the structure of a rolling member that is placed at the end of a conveying roller. FIG. 5 is an illustrative drawing showing the device for evaluating the effects of this invention.

Structure of the Blasting Machine

As shown in FIG. 1, the blasting machine 20 comprises:

a nozzle unit 10 for blasting abrasives toward workpieces, a chamber for blasting 21 in which the blasting process is carried out, a conveying apparatus 30 for conveying workpieces into the chamber for blasting 21, a tank for storing the abrasives, a hopper 23 for holding the abrasives that supplies a predetermined quantity of the abrasives to a nozzle 11 (see FIG. 2), a compressed-air-supplying apparatus 24 to supply compressed air to the nozzle 11, a classification apparatus 25 for collecting the used abrasives and the dust of the blasted workpieces, and for classifying the reusable abrasives, the non-reusable abrasives, and the dust, and a dust collector 26 for removing the dust from the classification apparatus 25 by vacuuming the apparatus 25.

A carrying-in opening 21a for carrying the workpieces into the chamber for blasting 21 and a carrying-out opening 21b for carrying the workpieces out of the chamber 21 are disposed at the side wall of the chamber 21. Air blowers 21c, for removing the abrasives from the surfaces of the workpieces, are disposed above and below the conveying apparatus 30 near the carrying-out opening 21b so that the conveying apparatus 30 is located between the air blowers 21c. A device 21d for collecting the used abrasives and the dust of the blasted workpieces by vacuuming the chamber 21 is disposed at the bottom of the conveying apparatus 30, and connected to the classification apparatus 25.

A sweeping device 21e is disposed at the roof of the chamber for blasting 21, which device 21e can move the nozzle unit 10 along the direction ("X-direction") of the movement of the conveying apparatus 30 and the horizontal direction ("Y-direction") orthogonal to the X-direction, to sweep the nozzle unit 10 over the workpieces in the chamber for blasting 21.

A compressed-air-supplying hose 24a that communicates with the compressed-air-supplying apparatus 24 and an abrasives-supplying hose 23a that communicates with the hopper 23 for holding the abrasives, are connected to the nozzle 11.

Conveying Apparatus

Next, the conveying apparatus 30 is explained. FIG. 2 is an illustrative drawing from a plane view as viewed from the top of the conveying apparatus 30. As shown in FIG. 2, the conveying apparatus 30 has a plurality of conveying rollers 31 that are arranged in parallel to each other and with equal intervals, which rollers 31 form a passage for conveying the workpieces.

The plurality of conveying rollers 31 comprises shafts 32 that act as axes of rotation, which shafts 32 are made of a metal material, and a plurality of rolling members 33 for conveying the workpieces, which are panels P. The plurality of rolling members 33 are disposed at the peripheral surface of the shafts 32 with predetermined interval along the longitudinal direction of the shaft 32. Except for the rolling members 33m that are disposed at the ends of the shaft 32, the rolling members 33 of the conveying rollers 31 are arranged so that the rolling members 33 of the adjacent conveying rollers 31 form a zigzag pattern in the direction for the conveyance ("X-direction").

The arrangement of the conveying rollers 31 and the rolling members 33 is determined based on the size or weight of the workpieces to be conveyed. For example, for this embodiment, each interval of the conveying rollers 31 is 155 mm. Further, the distance between the rolling members 33m that are disposed at the ends of the shafts 32 is determined so that the distance is a little bit greater than the width of the panel P.

The shaft 32 of the conveying rollers 31 is rotatably supported at its ends by means of bearings (not shown). The shaft 32 is rotated by the driving device 34, which has a driving means, such as an electrical motor. The rolling members 33 can generate the force for conveying the workpieces by rotating shafts 32 by means of the driving device 34. Consequently, the workpieces can be conveyed. In FIG. 2, the direction for conveying the workpieces is from the left side to the right side ("X-direction") of the conveying apparatus 30. Thus, the shafts 32 are driven and rotate so that the upper surfaces of the shafts 32 move from the left side to the right side.

The rolling members 33 comprise the following:

a peripheral part 33a for generating the force for conveying the panel P, a trunk 33b, wherein the peripheral part 33a is fixed to the outer surface of the trunk 33b, and a fixing member 33c to fix the peripheral part 33a to the trunk 33b.

The peripheral part 33a has a donut-like shape, comprising an outer surface contacting the panel P and having a cylindrical shape, and an inner surface having a diameter almost equal to the diameter of the outer surface 33d of the trunk 33b. The peripheral part 33a is made of an elastic material softer than the material of a panel P, which is made of a glass substrate.

The trunk 33b is made of a metallic material, such as stainless steel, and is fixed to the predetermined, position of the shaft 32 by screws. The outer surface 33d of the trunk 33b has a cylindrical shape. A shoulder section 33e for fixing the peripheral part 33a is disposed at one end of the outer surface 33d of the trunk 33b, which section 33e radially protrudes from the outer surface 33d.

The fixing member 33c has a disk-like shape. Its outer diameter is almost equal to the diameter of the shoulder section 33e. To fix the peripheral part 33a to the trunk 33b, after inserting the outer surface 33d of the trunk 33b into the inner surface of the peripheral part 33a, the fixing member 33c is fixed to the trunk 33b by screws so that the peripheral part 33a can be fixed to the trunk 33b by sandwiching the peripheral parts 33a between the shoulder section 33e and the fixing member 33c.

Since the peripheral parts 33a are made of an elastic material softer than the material of the panel P, which corresponds to the work, when the blasting process is carried out, if the used abrasives get stuck between the peripheral parts 33a and the panel P, which is made of a fragile material, such as glass, the panel P can be conveyed without being damaged by the used abrasives, because the peripheral parts 33a act as a cushioning material that can reduce the force caused by the used abrasives and loaded on the panel P. Further, since the peripheral parts 33a are made of a soft elastic material, the used abrasives are removed from the surfaces of the peripheral parts 33a when the loads caused by the weight of the panel P are eliminated from the peripheral parts 33a. This will help to prevent the panel P from being damaged by the used abrasives that are attached to the peripheral parts 33a.

For this embodiment, the peripheral parts 33a are made of urethane foam having a structure that includes separated air bubbles. As shown in this embodiment, when the panel P, which is made of a glass substrate, is processed by blasting abrasives, it is preferable that the peripheral parts 33a be made of urethane foam having 50-60 hardness of Type A durometer as defined by JIS K6253 (Japan Industrial Standards; Rubber, vulcanized or thermoplastic—Determination of hardness), and having a structure that includes separated air bubbles, because the peripheral parts 33a effectively act as a cushioning material that can reduce the force caused by the used abrasives and loaded on the workpieces. Further, since the urethane foam has a structure comprising separated air bubbles, there are no open pores at the surfaces of the peripheral parts 33a. Thus, since the used abrasives can easily be removed from the peripheral parts 33a, the workpieces can be prevented from being damaged by the used abrasives that are attached to the peripheral parts 33a.

Further, it is preferable that the material of the peripheral parts 33a have a high abrasion resistance property or a small abrasion index, which abrasion is caused by blasting abrasives or by the sliding between the surfaces of the peripheral parts 33a and the panel P. Since the abrasion of the peripheral parts 33a is low, and since the outer diameter of the rolling member 33 hardly changes, a uniform force for conveying the workpieces can be achieved. Thus, the panel P can be prevented from moving along the S-shaped passage. Further, the frequency of the replacement of the peripheral parts 33a can be reduced.

The width W of the contacting surface 33f of the peripheral parts 33a is determined based on the consideration of the number of the rolling members 33, and the surface pressure of the peripheral parts 33a when the work is placed on it. For this embodiment, the width W is 20 mm. The width of the peripheral parts 33a need not be uniform, if the width W of the contacting surface 33f is properly determined. For example, when the width of the outer surface 33d of the trunk 33b is great, a peripheral part 33a having a wide portion that is sandwiched between the shoulder section 33e and the fixing member 33c may be used.

As shown in FIG. 4, the rolling member 33m that is disposed at the end of the shaft 32 comprises a guide member 33g disposed at the outer side of the rolling member 33m, which guide member 33g radially protrudes so that the height of the guide member 33g from the surface of the shaft 32 is higher than that of the peripheral part 33a from the surface of the shaft 32. Thus, if the panel P moves along the large S-shaped passage when it is conveyed, the panel P can be prevented from coming out of the conveying apparatus 30.

Method for a Blasting Process

Below, a method for a blasting process that uses the blasting machine 20 of this embodiment is explained. For this embodiment, a solar cell panel is used for a work to be processed. A a-Si type solar cell panel P is made by forming a surface-electrode layer, which corresponds to ITO, an a-Si layer, and a back-electrode layer, on the surface of the substrates made of glass ("glass substrates"), in this order. An electrical short circuit between the surface-electrode layer and the back-electrode layer is caused at the peripheral edge of the glass substrates because of the disturbance of the state of each layer. Thus, at the peripheral edge of the panel P (the glass substrates), to delete the portion of the electrical short circuit, it is necessary that the edge portion of the surface-electrode layer be left as a connecting point for a lead, and that the edge portions of the back-electrode layer and the a-Si layer be removed. For this embodiment, by using a panel P that has a rectangular shape that is 1500 mm×1100 mm and 5 mm thick, the blasting process was carried out at the entire peripheral edge of the panel P.

First, after placing the panel P on the conveying roller 31 of the conveying apparatus 30, the driving device 34 is driven to rotate the shaft 32, and then the panel P is conveyed and transferred into the chamber for blasting 21 from the carrying-in opening 21a of the chamber 21.

Since the rolling members 33 of the adjacent conveying rollers 31 are arranged so that the rolling members 33 form a zigzag pattern in the direction for the conveyance, even if a load is generated that causes the panel P to move along the S-shaped passage on the conveying apparatus, the conveying rollers 31 can properly transfer a load for conveying the panel P and can correct the direction of the movement of the panel P. Thus, the panel P can be prevented from moving along the S-shaped passage. Since large and flat plate-shaped workpieces are likely to move along the S-shaped passage when they are conveyed by the conveying apparatus, such a conveying apparatus is preferable to convey the workpieces such as a panel P.

Next, the panel P that is transferred into the chamber for blasting 21 is lifted above the conveying rollers 31 and fixed to the predetermined position by a positioning device (not shown) so that the respective sides of the panel P are oriented in parallel to the X-direction and Y-direction. By lifting the panel P above the conveying rollers 31, the conveying rollers can be prevented from being directly blasted at close range. Further, the precision of the positioning of the panel P can be improved.

Next, the nozzle unit 10 is positioned at the predetermined starting point of the blasting process by means of the sweeping device 21e. While the nozzles 11 sweep over the peripheral edge of the panel P at the predetermined speed, the nozzles 11 blast abrasives, which are abrasive alumina grains having a mean grain size of 24 μm, onto the peripheral edge of a predetermined width of the panel P to remove the thin layers on the peripheral edge. The conditions of the blasting process are controlled by a control device (not shown) installed on the blasting machine 20.

The blasting process is carried out based on the method explained below.

The compressed air is provided to the nozzles 11 through the compressed-air-supplying hose 24a from the compressed-air-supplying apparatus 24. Then, the compressed air is ejected into the nozzles 11.

The quantity of the abrasives to be supplied is controlled by the hopper 23 for holding the abrasives. The abrasives are supplied to inside the nozzles 11 through the abrasives-supplying hose 23a by means of the negative pressure that is caused when the compressed air passes through the nozzles 11 from the compressed-air-supplying hose 24a. The abrasives supplied to the inside of the nozzles 11 are mixed with the compressed air, and then are accelerated and blasted toward the work. The blasted abrasives hit the predetermined place on the surface of the work. In this way, the blasting process is carried out.

The used abrasives and the dust of the blasted workpieces, which are scattered after hitting the work, are recovered from the device 21d by vacuuming the device 21d by means of a fan in the dust collector 26, and then are conveyed to the classification apparatus 25 with air and classified. The reusable abrasives having a predetermined grain size, which abrasives are classified by the classification apparatus 25, are returned to the tank for storing the abrasives of the hopper 23, to be reused.

After blasting abrasives toward the peripheral edge of the panel P, the panel P is lowered and placed on the conveying rollers 31 by the positioning device. Next, the panel P is conveyed from the chamber for blasting 21 through the carrying-out opening 21b by rotating shafts 32 by moving the driving device 34. Then, the blasting process is completed. The abrasives attached to the panel P are blown off by the air blowers 21c disposed near the carrying-out opening 21b and at the inside of the chamber for blasting 21, and removed from the panel P. Since the pressure in the chamber for blasting 21 is negative, the abrasives and the dust do not leak from the carrying-out opening 21b.

The method for fixing the peripheral part 33a to the trunk 33b can arbitrarily be determined. For example, the peripheral part 33a may be fixed to the trunk 33b by an adhesive. Alternatively, the peripheral part 33a may be fixed to the trunk 33b by inserting the trunk 33b into the bore of the peripheral part 33a after machining the bore so that the diameter of the bore becomes slightly smaller than the outer diameter of the trunk 33b. Further, the peripheral part 33a may be formed by a method of an injection molding or a slipcasting, by which a raw resin to form the peripheral part 33a is poured into a mold that preliminarily houses the trunk 33b within the mold.

If the driving device 34 can rotate the shafts 32 while controlling the movement of the shafts 32, the method for moving the shafts 32 of the driving device 34 can be arbitrarily determined. For example, pulleys can be used as the means for transferring the power to rotate the shafts 32.

For this embodiment, it is explained that the panels P, made of a glass substrate, are used as workpieces. However, the workpieces are not limited to such a panel P. The conveying apparatus of this invention can be preferably applied to the blasting process for workpieces such as substrates for semiconductors, the properties of which products may be significantly affected by the flaws caused at their surfaces.

To clarify the relationship between the type of materials used for the conveying roller and the flaws caused at the surface of the panel P, the following tests are carried out.

First, a glass substrate as a material for a panel and plate-type test pieces made of the materials shown in Table 1 were prepared. The material of the test piece of comparative example 1 had a hardness greater than that of the glass substrate. The material of the test piece of comparative example 2 had a hardness that was the same as that of the glass substrate. The materials of the test pieces of comparative examples 3-7 had a hardness less than that of the glass substrate. The materials of the test pieces of comparative example 5 and the embodiment of this invention had 50-60 hardness of Type A durometer as defined by JIS K6253 (Japan Industrial Standards; Rubber, vulcanized or thermoplastic—Determination of hardness). The materials of the respective test pieces of comparative examples 1-6 were not foamed. The material of the test piece of comparative example 7 was foamed. It had a structure that included communicating air bubbles and open pores at its surface. The material of the test piece of the embodiment of this invention was foamed, and had a structure that included separated air bubbles and did not have open pores at its surface.

TABLE 1

| Materials of Test Pieces | |
|---|---|
| Embodiment | A urethane foam having a structure comprising separated air bubbles: Hardness of type-A durometer = 57 |
| Comparative Example 1 | A carbon steel (SK: a carbon tool steel): Hardness Hv = 600 |
| Comparative Example 2 | A nitrile rubber: Hardness of type-A durometer = 70 |
| Comparative Example 3 | A high-molecular polyethylene: Hardness of type-A durometer = 65 |
| Comparative Example 4 | A urethane: Hardness of type-A durometer = 70 |
| Comparative Example 5 | A urethane: Hardness of type-A durometer = 50 |
| Comparative Example 6 | A urethane: Hardness of type-A durometer = 35 |
| Comparative Example 7 | A urethane foam having a structure comprising air bubbles communicated with each other: Hardness of type-A durometer = 55 |

As shown in FIG. 5, the tests were carried out based on the following procedures:
(1) abrasives 42 were sandwiched between a horizontal glass substrate 40 and a plate-type test piece 41,
(2) then, a weight was placed on the plate-type test piece 41 to apply a downward force to the test piece 41, and
(3) then the plate-type test piece 41 was moved in parallel with the glass substrate 40 so that the test piece 41 had a reciprocating motion.

The abrasive alumina grains having a mean grain size of alumina of 25 μm (WA #600, which are produced by Sintobrator, Ltd.), were used as the abrasives. The downward force caused by the weight, the maximum speed of the plate-type test piece 41, and the number of the reciprocating motions of the test piece 41, were 5 Kgf, 400 mm/second, and 10 times, respectively.

An evaluation of the test, namely, whether flaws were caused at the surfaces of the glass substrate 40, was carried out based on the following procedures:
(1) The surface roughness Ra (an arithmetic average of a roughness profile) of the glass substrate 40 was measured before and after the test.
a) When the difference between the surface roughness before the test and that after the test was less than 0.002 μm, it was judged that no flaw was caused at the surface of the glass substrate 40, and thus, the evaluation was positive (○).

b) When the difference between the surface roughness before the test and that after the test was greater than 0.002 μm, it was judged that flaws were caused at the surface of the glass substrate 40, and thus, the evaluation was negative (X).

Since the average of the surface roughness of the glass substrate 40 before the test was 0.009 μm Ra, when the surface roughness of the glass substrate 40 after the test was greater than 0.011 μm Ra, it was judged that the evaluation was negative (X).

The results of the tests are shown in Table 2. For comparative example 1, in which the material of the plate-type test piece 41 had a hardness greater than that of the glass substrate 40, since the surface roughness of the glass substrate 40 after the test was much greater than 0.011 μm Ra, which was the criteria value used to evaluate, the evaluation was negative (X). Even if the material having a hardness less than that of the glass substrate 40 was used for the plate-type test piece 41, when, as with comparative examples 2-6, the material was not foamed, or when the material had a structure that included open pores at the surface of the material, as did comparative example 7, the evaluation was negative (X).

parts 33a. This will help to prevent the next panel P to be processed from being damaged by the used abrasives attached to the peripheral parts 33a.

(2) When the peripheral parts 33a are made of urethane foam having a structure comprising separated air bubbles, it is preferable to blast abrasives toward the panel P, which is made of a fragile material, such as glass, because the peripheral parts 33a effectively act as a cushioning material that can reduce the force caused by the used abrasives and loaded on the panel P. Further, since the urethane foam has the structure comprising separated air bubbles, there are no open pores at the surfaces of the peripheral parts 33a. Thus, since it is easy to remove the used abrasives from the surfaces of the peripheral parts 33a, the panel P to be processed the next time can be prevented from being damaged by the used abrasives attached to the peripheral parts 33a.

At the adjacent conveying rollers 31, the rolling members 33 are arranged so that they form a zigzag pattern in the direction for the conveyance. Thus, even if a load is generated that causes the panel P to move along the S-shaped passage on the conveying apparatus, the conveying rollers 31 can prevent the panel P from moving along the S-shaped passage on the conveying apparatus because the conveying rollers 31 can

TABLE 2

| | Materials of Test Pieces | Result of the Measurement of the surface roughness after the tests Ra (μm) | Evaluation |
|---|---|---|---|
| Embodiment | A urethane foam having a structure comprising separated air bubbles: Hardness of type-A durometer = 57 | 0.010 | ○ |
| Comparative Example 1 | A carbon steel (SK: a carbon tool steel): Hardness Hv = 600 | 0.801 | x |
| Comparative Example 2 | A nitrile rubber: Hardness of type-A durometer = 70 | 1.582 | x |
| Comparative Example 3 | A high-molecular polyethylene: Hardness of type-A durometer = 65 | 1.066 | x |
| Comparative Example 4 | A urethane: Hardness of type-A durometer = 70 | 0.505 | x |
| Comparative Example 5 | A urethane: Hardness of type-A durometer = 50 | 0.302 | x |
| Comparative Example 6 | A urethane: Hardness of type-A durometer = 35 | 0.157 | x |
| Comparative Example 7 | A urethane foam having a structure comprising air bubbles communicated with each other: Hardness of type-A durometer = 55 | 0.035 | x |

From the explanation in the above paragraph, one can see that the evaluation of the embodiment of this invention was only positive (○) when the material of the test piece 41 had a hardness less than that of the glass substrate 40, and when the material had a structure that included separated air bubbles. Namely, the effects of this invention were verified.

Thus, the present invention has the following effects:

(1) By the conveying apparatus 30 of this invention, the respective rolling members 33 of the conveying roller comprise the peripheral parts 33a. The peripheral parts 33a are made of a softer elastic material than the material of the panel P. Thus, since when used abrasives get stuck between the peripheral parts 33a and the panel P, the peripheral parts 33a act as a cushioning material that can reduce the force caused by the used abrasives and loaded on the panel P, even if the panel P is made of a fragile material, such as glass, the panel P can be conveyed without flaws being caused by the used abrasives. Further, since the peripheral parts 33a are made of an elastic material, the used abrasives are removed from the surfaces of the peripheral parts 33a when the loads caused by the weight of the panel P are eliminated from the peripheral properly transfer a load for conveying the panel P to them so that the panel P can be prevented from moving along the S-shaped passage on the conveying apparatus. Since large and flat plate-shaped workpiece is likely to move along the S-shaped passage when they are conveyed by a conveying apparatus, such a conveying apparatus is preferable to convey the workpieces, such as the panel P.

For the embodiment explained in the above paragraphs, the peripheral parts 33a are made of the urethane foam. However, the elastic material used for the peripheral parts 33a can be selected based on the material of the workpieces to be conveyed. For example, a rubber, such as a silicone rubber, can be used for a material of the peripheral parts 33a.

What we claim is:

1. A conveying apparatus for loading and conveying workpieces, the apparatus being located in a blasting machine for blasting the workpieces with a mixture of compressed air and abrasives from a nozzle toward the workpieces, the conveying apparatus, comprising:
   a plurality of conveying rollers placed in parallel in a line so that the rollers form a passage for the workpieces, wherein the conveying roller comprises:

a shaft that acts as an axis of rotation, and a plurality of rolling members disposed at a peripheral surface of the shaft with a predetermined interval along a longitudinal direction of the shaft, wherein the outer surfaces of the plurality of rolling members form a surface of the passage for the workpieces, wherein the workpieces can be conveyed by rotating each shaft, wherein peripheral parts of the rolling members, which parts contact the workpieces, are made of a softer elastic material than a material of the workpieces, and wherein, when used abrasives get stuck between the peripheral parts of the rolling members and the workpieces, the peripheral parts act as a cushioning material that can reduce the force caused by the used abrasives against the workpieces, and wherein the peripheral parts of the rolling members are made of urethane foam having a structure that includes separated air bubbles.

2. The conveying apparatus of claim 1, wherein the rolling members of the plurality of conveying rollers are arranged so that the rolling members of adjacent conveying rollers form a zigzag pattern in a direction for the passage of the workpieces.

3. The conveying apparatus of claim 1, wherein the rolling members of the plurality of conveying rollers are arranged so that the rolling members of adjacent conveying rollers form a zigzag pattern in a direction for the passage of the workpieces.

4. A blasting machine for blasting a mixture of compressed air and abrasives from a nozzle toward workpieces, wherein the blasting machine carries out the blasting process for the workpieces while sweeping the nozzle over the workpieces, and wherein the blasting machine comprises the conveying apparatus of any one of claims 1, 2, and 3.

* * * * *